United States Patent [19]
Hoole

[11] Patent Number: 5,864,543
[45] Date of Patent: Jan. 26, 1999

[54] TRANSMIT/RECEIVE COMPENSATION IN A TIME DIVISION DUPLEX SYSTEM

[75] Inventor: Elliott Hoole, Redmond, Wash.

[73] Assignee: AT&T Wireless Services, Inc., Middletown, N.J.

[21] Appl. No.: 806,508

[22] Filed: Feb. 24, 1997

[51] Int. Cl.$^6$ .................................................. H04B 7/216
[52] U.S. Cl. .......................... 370/280; 370/207; 370/342; 375/206; 455/502
[58] Field of Search .................................... 370/335, 342, 370/277, 278, 280, 282; 375/206, 200; 455/502

[56] References Cited

U.S. PATENT DOCUMENTS

| | | | |
|---|---|---|---|
| 3,641,463 | 2/1972 | Perks | 332/124 |
| 3,745,464 | 7/1973 | Lee | 455/61 |
| 3,971,988 | 7/1976 | Deneberg | 455/143 |
| 4,510,595 | 4/1985 | Glance et al. | 370/278 |
| 5,084,869 | 1/1992 | Russell | 370/329 |
| 5,363,375 | 11/1994 | Chuang et al. | 370/332 |
| 5,570,349 | 10/1996 | Bustamante et al. | 371/335 |
| 5,613,211 | 3/1997 | Matsuno | 455/502 |

FOREIGN PATENT DOCUMENTS

| | | |
|---|---|---|
| 0 690 593 | 1/1996 | European Pat. Off. . |
| 97/05709 | 2/1997 | WIPO . |

OTHER PUBLICATIONS

Jung, P. et al., "On Multicarrier CDMA Mobile Radio Systems with Joint Detection and Coharant Receiver Antenna Diversity," Gateway to the Twenty First Centurs, International Conference on Universal Personal Communications 1996 5th IEEE Int'l Conference on Universal Personal Communications Record (CAT. No. 6th8185), Proceedings of ICUPC–5th International Confer, pp. 61–65, vol. 1, XP002073391.

*Primary Examiner*—Chi H. Pham
*Assistant Examiner*—W. Todd Baker

[57] ABSTRACT

In a time division duplex (TDD) system, compensation measurements are made for the transmission circuitry during the receive portion of the TDD cycle and compensation measurements are made for the receive circuitry during the transmit portion of the TDD cycle. A base station has multiple antennas for spatial, as well as spectral, spreading and despreading of discrete multitone spread spectrum (DMT-SS) communications. Each antenna has its own transmission path components and receive path components. The transmit amplifier, for example, in the transmit path and the receive amplifier, for example, in the receive path tend to drift in their characteristics over time. The invention manages the sequential testing of each respective transmission path and receive path for each antenna. The invention measures the drift of the transmit path components and the receive path components and prepares compensating weights to be applied to signals processed in each path.

20 Claims, 4 Drawing Sheets

TRANSMIT/RECEIVE COMPENSATION IN A TIME DIVISION DUPLEX SYSTEM

CROSS-REFERENCES TO RELATED APPLICATIONS

The invention disclosed herein is related to the copending U.S. patent application by Siavash Alamouti, Doug Stolarz, and Joel Becker, entitled "VERTICAL ADAPTIVE ANTENNA ARRAY FOR A DISCRETE MULTITONE SPREAD SPECTRUM COMMUNICATIONS SYSTEM", Ser. No. 08/937,654, pending filed on the same day as the instant patent application, assigned to AT&T Wireless Services, and incorporated herein by reference.

BACKGROUND OF THE INVENTION

1. Field of the Invention

This invention involves improvements to communications systems and methods in a wireless discrete multitone spread spectrum communications system.

2. Description of Related Art

Wireless communications systems, such as cellular and personal communications systems, operate over limited spectral bandwidths. They must make highly efficient use of the scarce bandwidth resource to provide good service to a large population of users. Code Division Multiple Access (CDMA) protocol has been used by wireless communications systems to efficiently make use of limited bandwidths. The protocol uses a unique code to distinguish each user's data signal from other users' data signals. Knowledge of the unique code with which any specific information is transmitted, permits the separation and reconstruction of each user's message at the receiving end of the communication channel.

The personal wireless access network (PWAN) system described in the referenced Alamouti, et al. patent application, uses a form of the CDMA protocol known as discrete multitone spread spectrum (DMT-SS) to provide efficient communications between a base station and a plurality of remote units.

In this protocol, the user's data signal is modulated by a set of weighted discrete frequencies or tones. The weights are spreading codes that distribute the data signal over many discrete tones covering a broad range of frequencies. The weights are complex numbers with the real component acting to modulate the amplitude of a tone while the complex component of the weight acts to modulate the phase of the same tone. Each tone in the weighted tone set bears the same data signal. Plural users at the transmitting station can use the same tone set to transmit their data, but each of the users sharing the tone set has a different set of spreading codes. The weighted tone set for a particular user is transmitted to the receiving station where it is processed with despreading codes related to the user's spreading codes, to recover the user's data signal. For each of the spatially separated antennas at the receiver, the received multitone signals are transformed from time domain signals to frequency domain signals. Despreading weights are assigned to each frequency component of the signals received by each antenna element. The values of the despreading weights are combined with the received signals to obtain an optimized approximation of individual transmitted signals characterized by a particular multitone set and transmitting location. The PWAN system has a total of 2560 discrete tones (carriers) equally spaced in 8 MHZ of available bandwidth in the range of 1850 to 1990 MHZ. The spacing between the tones is 3.125 kHz. The total set of tones are numbered consecutively form 0 to 2559 starting from the lowest frequency tone. The tones are used to carry traffic messages and overhead messages between the base station and the plurality of remote units. The traffic tones are divided into 32 traffic partitions, with each traffic channel requiring at least one traffic partition of 72 tones.

In addition, the PWAN system uses overhead tones to establish synchronization and to pass control information between the base station and the remote units. A Common Link Channel (CLC) is used by the base to transmit control information to the Remote Units. A Common Access Channel (CAC) is used to transmit messages from the Remote Unit to the Base. There is one grouping of tones assigned to each channel. These overhead channels are used in common by all of the remote units when they are exchanging control messages with the base station.

In the PWAN system, Time Division Duplexing (TDD) is used by the base station and the remote unit to transmit data and control information in both directions over the same multi-tone frequency channel. Transmission from the base station to the remote unit is called forward transmission and transmission from the remote unit to the base station is called reverse transmission. The time between recurrent transmissions from either the remote unit or the base station is the TDD period. In every TDD period, there are four consecutive transmission bursts in each direction. Data is transmitted in each burst using multiple tones. The base station and each remote unit must synchronize and conform to the TDD timing structure and both the base station and the remote unit must synchronize to a framing structure. All remote units and base stations must be synchronized so that all remote units transmit at the same time and then all base stations transmit at the same time. When a remote unit initially powers up, it acquires synchronization from the base station so that it can exchange control and traffic messages within the prescribed TDD time format. The remote unit must also acquire frequency and phase synchronization for the DMT-SS signals so that the remote is operating at the same frequency and phase as the base station.

The PWAN wireless communications system, and other limited bandwidth communications systems, need to exploit new techniques to make the most efficient use of the scarce bandwidth resource to provide good service to a large population of users. When the characteristics of the transmit path and the receive path change with time, some means is required to compensate for tha drift without imposing additional overhead on the traffic bearing channels.

SUMMARY OF THE INVENTION

The invention disclosed herein is a new technique to make the most efficient use of the scarce spectral bandwidth. In a time division duplex (TDD) system, compensation measurements are made for the transmission circuitry during the receive portion of the TDD cycle and compensation measurements are made for the receive circuitry during the transmit portion of the TDD cycle. A base station has multiple antennas for spatial, as well as spectral, spreading and despreading of discrete multitone spread spectrum (DMT-SS) communications. Each antenna has its own transmission path components and receive path components. The transmit amplifier, for example, in the transmit path and the receive amplifier, for example, in the receive path tend to drift in their characteristics over time. The invention manages the sequential testing of each respective transmission path and receive path for each antenna. The invention measures the drift of the transmit path components and the receive path components and prepares compensating weights to be applied to signals processed in each path.

The base station's digital signal processor (DSP) applies the spreading and despreading weights for the DMT-SS signals for the transmit path and the receive path, respectively, for each antenna. In a first TDD interval, a test controller coupled to the DSP, uses the TDD timing signal from the DSP to first test the receive path of a first antenna (during the base station transmission period). To test the receive path, the test controller takes a multitone test signal output from the frequency modulator in the transmit path and applies it to a test transmitter that directs the multitone signal to the input of the receive amplifier in the receive path. The DSP processes the received test signal output by the receive amplifier and compiles receive path compensation weights that are stored in a receive path compensation buffer. The receive path compensation weights are then applied to the DMT-SS signals received in all later TDD receive periods, until the receive path test for that antenna are repeated. In one embodiment of the invention, a switch under the control of the test controller selectively directs the multitone test signal output from the test transmitter to the input of the receive amplifier in the receive path. In another, preferred embodiment of the invention, a probe antenna coupled to the output of the test transmitter directs the multitone test signal output from the test transmitter to the input of the receive amplifier in the receive path.

In the base receive period of the first TDD interval, the test controller coupled to the DSP, uses the TDD timing signal from the DSP to test the transmission path of the first antenna. To test the transmission path, the test controller applies a multitone test signal output from the frequency modulator in the transmit path to the transmitter in the transmit path. The test controller then directs the resultant signal output from the transmitter in the transmit path to the input of a test receiver. The output of the test receiver is than applied to the multitone frequency demodulator in the receive path, in a short interval so as to not overlap the DMT-SS signals being output by the receive amplifier during the receive period. The DSP processes the received test signal applied by the test receiver and compiles transmit path compensation weights that are stored in a transmit path compensation buffer. The transmit path compensation weights are then applied to the DMT-SS signals transmitted in all later TDD receive periods, until the transmit path test for that antenna is repeated. In one embodiment of the invention, a switch under the control of the test controller selectively directs the signal output from the transmitter amplifier to the input of the test receiver. In another, preferred embodiment of the invention, a probe antenna coupled to the output of the transmitter amplifier directs the signal output from the transmitter amplifier to the input of the test receiver.

The test controller then moves on to the second antenna in the next consecutive (second) TDD interval. The test controller coupled to the DSP, uses the TDD timing signal from the DSP to first test the receive path of a second antenna (during base station transmission period) and then to test the transmit path of the second antenna (during base station receive period).

Currently, the invention has advantageous applications in the field of wireless communications, such as cellular communications or personal communications, where bandwidth is scarce compared to the number of the users and their needs. Such applications may be effected in mobile, fixed, or minimally mobile systems. However, the invention may be advantageously applied to other, non-wireless, communications systems as well.

DESCRIPTION OF THE PREFERRED EMBODIMENT

Figure 1:
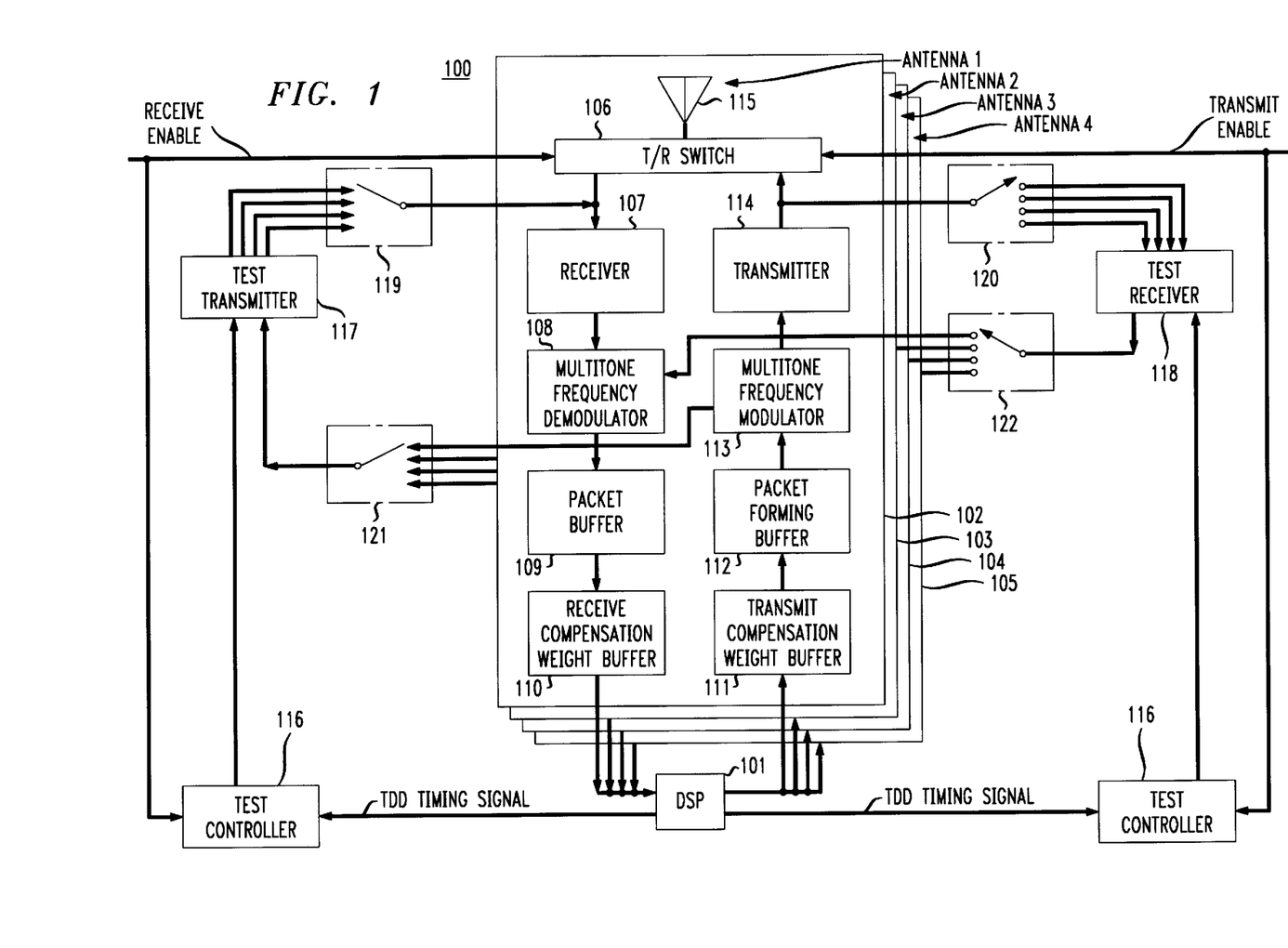
FIG. 1 is a block diagram showing an overview of transmit/receive compensation according the present invention.
Figure 2:
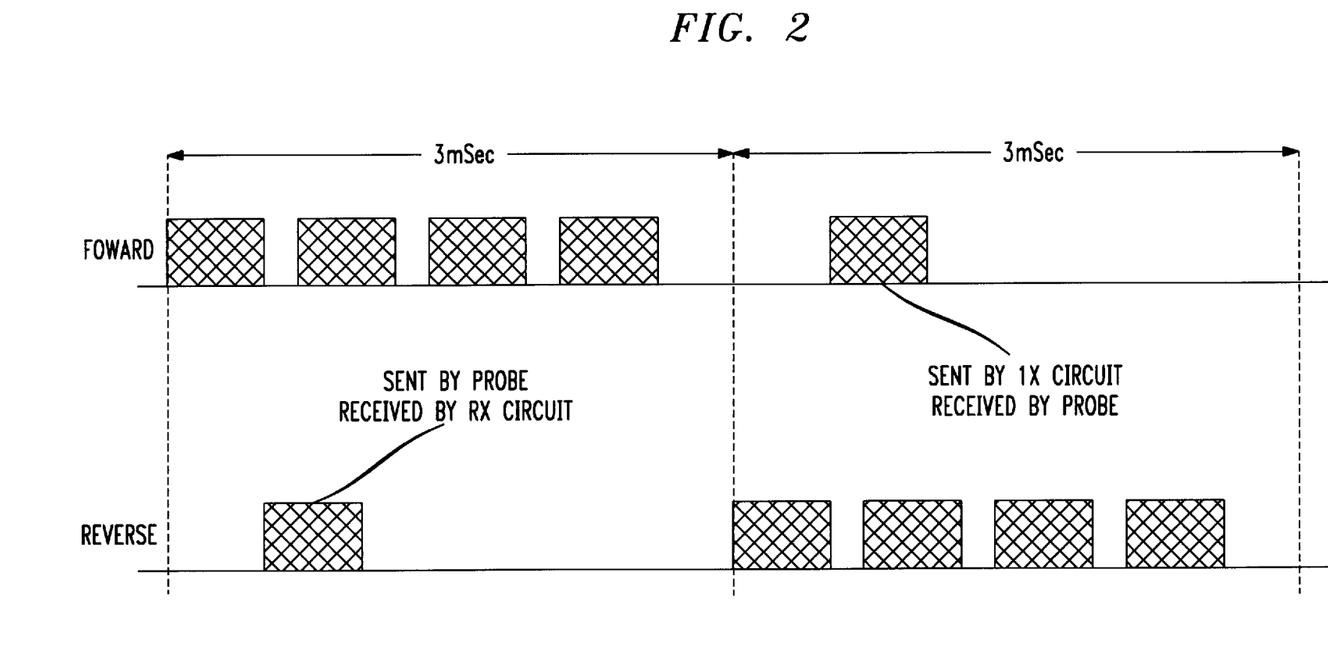
FIG. 2 is a timing diagram for transmit/receive compensation timing for a base station.

FIG. 1 is a block diagram showing an overview of transmit/receive compensation according the present invention. FIG. 2 is a timing diagram for transmit/receive compensation timing for a base station. In a time division duplex (TDD) system, compensation measurements are made for the transmission circuitry during the receive portion of the TDD cycle and compensation measurements are made for the receive circuitry during the transmit portion of the TDD cycle. A base station 100 has multiple antennas 115 for spatial, as well as spectral, spreading and despreading of discrete multitone spread spectrum (DMT-SS) communications. A base station 100 has a plurality of N transmit/receive modules, for example the four modules 102, 103, 104, and 105 in FIG. 1. Each transmit/receive module has an antenna 115 coupled to a transmit/receive switch 106. Each transmit/receive switch 106 is controlled to be in the transmit mode when the transmit enable signal is on, and is controlled to be in the receive mode when the receive enable signal is on. Antenna 1 is on transmit/receive module 102. Antenna 2 is on transmit/receive module 103. Antenna 3 is on transmit/receive module 104. Antenna 4 is on transmit/receive module 105. Each antenna 115 has its own transmission path components and receive path components. In FIG. 1, the transmission path includes the transmit compensation weight buffer 111, the packet forming buffer 112, the multitone frequency modulator 113, and the transmitter 114. The receive path includes the receiver 107, the multitone frequency demodulator 108, the packet buffer 109, and the receive compensation weight buffer 110. The transmit compensation weight buffer 111 and the receive compensation weight buffer 110 in each transmit/receive module are coupled to a digital signal processor (DSP) 101 common to all of the transmit/receive modules. The receiver 107 and the transmitter 114 in each transmit/receive module is coupled to the transmit/receive switch 106 on the same transmit/receive module.

The transmitter amplifier 114 in the transmit path and the receiver amplifier 107 in the receive path tend to drift in their characteristics over time. The invention manages the sequential testing of each respective transmission path and receive path for each antenna 115. The invention measures the drift of the transmit path components and the receive path components and prepares compensating weights to be applied to signals processed in each path. The sequential testing is accomplished by the test controller 116, the test transmitter 117, and the test receiver 118 that are common to all of the plurality of transmit/receive modules 102, 103, 104, and 105 in FIG. 1. The test controller 116 receives time division duplex (TDD) timing signals from the DSP 101 and also receives the receive enable and the transmit enable signals for timing. The test transmitter 117 is sequentially coupled to the receiver 107 on each of the plurality of transmit/receive modules 102, 103, 104, and 105 by means of the switch 119 controlled by the test controller 116. The test transmitter 117 is sequentially coupled to the multitone frequency modulator 113 on each of the plurality of transmit/receive modules 102, 103, 104, and 105 by means of the switch 121 controlled by the test controller 116. The test receiver 118 is sequentially coupled to the transmitter 114 on each of the plurality of transmit/receive modules 102, 103, 104, and 105 by means of the switch 120 controlled by the test controller 116. The test receiver 118 is sequentially coupled to the multitone frequency demodulator 108 on each of the plurality of transmit/receive modules 102, 103, 104, and 105 by means of the switch 122 controlled by the test controller 116.

The base station's digital signal processor (DSP) 101 applies the spreading and despreading weights for the DMT-SS signals for the transmit path and the receive path, respectively, for each antenna 115. In a first TDD interval, a test controller 116 coupled to the DSP, uses the TDD timing signal from the DSP to first test the receive path of a first antenna 1 on transmit/receive module 102 (during the base station TDD transmission period). To test the receive path, the test controller 116 takes a multitone test signal output from the frequency modulator 113 in the transmit path and applies it to a test transmitter 117 that directs the multitone signal to the input of the receive amplifier 107 in the receive path. The DSP 101 processes the received test signal output by the receive amplifier 107 and compiles receive path compensation weights that are stored in a receive path compensation buffer 110. The receive path compensation weights are then applied by the DSP 101 to the DMT-SS signals received in all later TDD receive periods, until the receive path test for that antenna 1 on module 102 is repeated.

In the base station's receive period of the first TDD interval, the test controller 116 coupled to the DSP 101, uses the TDD timing signal from the DSP to test the transmission path of the first antenna 1 of module 102. To test the transmission path, the test controller 116 applies a multitone test signal output from the frequency modulator 113 in the transmit path to the transmitter 114 in the transmit path. The test controller 116 then directs the resultant signal output from the transmitter 114 in the transmit path to the input of a test receiver 118. The output of the test receiver 118 is than applied to the multitone frequency demodulator 108 in the receive path, in a short interval so as to not overlap the DMT-SS signals being output by the receive amplifier 107 during the receive TDD period. The DSP 101 processes the received test signal applied by the test receiver 118 and compiles transmit path compensation weights that are stored in a transmit path compensation buffer 111. The transmit path compensation weights are then applied by the DSP 101 to the DMT-SS signals transmitted in all later TDD receive periods, until the transmit path test for that antenna 1 on module 102 is repeated.

The test controller 116 then moves on to the second antenna 2 on module 103 in the next consecutive (second) TDD interval by means of the switches 119, 120, 121, and 122. The test controller 116 coupled to the DSP, uses the TDD timing signal from the DSP to first test the receive path of a second antenna 2 of module 103 (during base station transmission TDD period) and then to test the transmit path of the second antenna 2 on module 103 (during base station receive TDD period). The new receive path compensation weights are then applied by the DSP 101 to the DMT-SS signals received in all later TDD receive periods, until the receive path test for that antenna 2 on module 103 is repeated. The new transmit path compensation weights are then applied by the DSP 101 to the DMT-SS signals transmitted in all later TDD receive periods, until the transmit path test for that antenna 2 on module 103 is repeated.

Then, the test controller 116 moves on to the third antenna 3 on module 104 in the next consecutive (third) TDD interval by means of the switches 119, 120, 121, and 122. The test controller 116 coupled to the DSP, uses the TDD timing signal from the DSP to first test the receive path of the third antenna 3 of module 104 (during base station transmission TDD period) and then to test the transmit path of the third antenna 3 on module 104 (during base station receive TDD period). The new receive path compensation weights are then applied by the DSP 101 to the DMT-SS signals received in all later TDD receive periods, until the receive path test for that antenna 3 on module 104 is repeated. The new transmit path compensation weights are then applied by the DSP 101 to the DMT-SS signals transmitted in all later TDD receive periods, until the transmit path test for that antenna 3 on module 104 is repeated.

Finally, the test controller 116 moves on to the fourth antenna 4 on module 105 in the next consecutive (fourth) TDD interval by means of the switches 119, 120, 121, and 122. The test controller 116 coupled to the DSP, uses the TDD timing signal from the DSP to first test the receive path of the fourth antenna 4 of module 105 (during base station transmission TDD period) and then to test the transmit path of the fourth antenna 4 on module 105 (during base station receive TDD period). The new receive path compensation weights are then applied by the DSP 101 to the DMT-SS signals received in all later TDD receive periods, until the receive path test for that antenna 4 on module 105 is repeated. The new transmit path compensation weights are then applied by the DSP 101 to the DMT-SS signals transmitted in all later TDD receive periods, until the transmit path test for that antenna 4 on module 105 is repeated.

After completing transmit path and receive path compensation for all four of the antennas on all four of the plurality of transmit/receive modules 102, 103, 104, and 105 in FIG. 1, the test controller 116 begins the cycle again by testing the first antenna 1 on module 102.

Figure 1A:
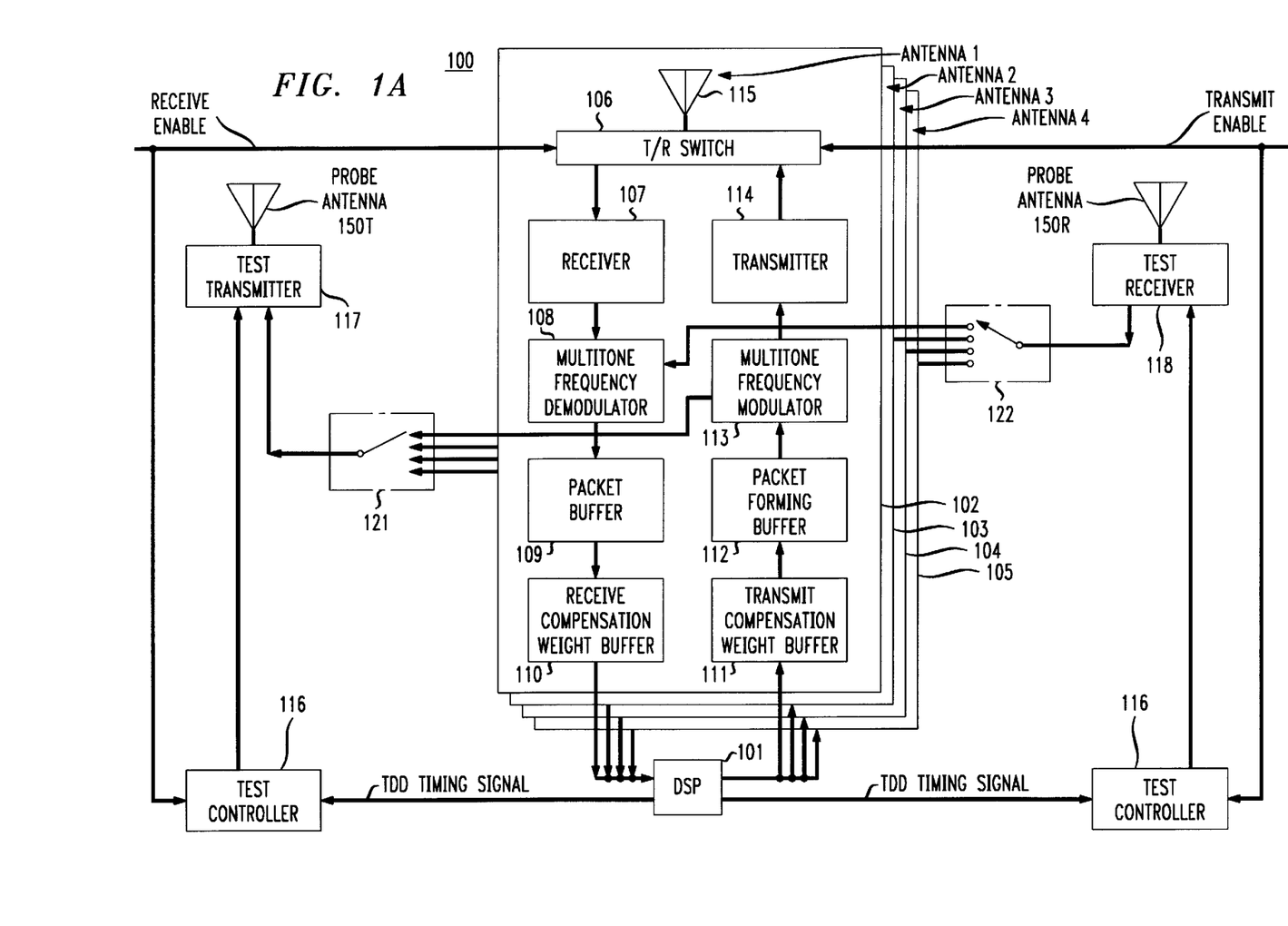
FIG. 1A is a block diagram showing an overview of transmit/receive compensation according to an alternate embodiment of the present invention.
Figure 1B:
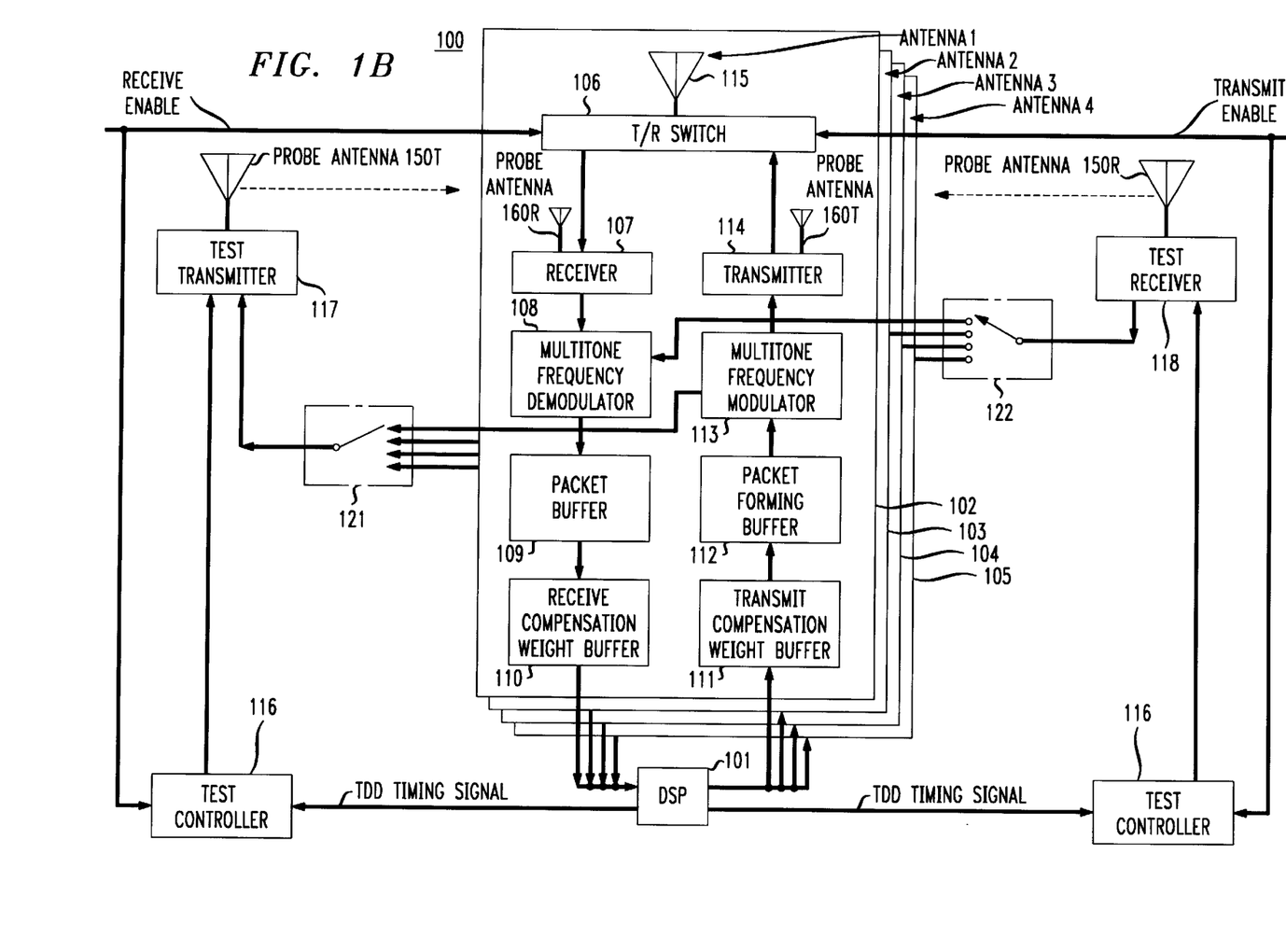
FIG. 1B is a block diagram showing an overview of transmit/receive compensation according to another alternate embodiment of the present invention.

In the first embodiment of the invention shown in FIG. 1 and described above, the switch 119 under the control of the test controller 116 selectively directs the multitone test signal output from the test transmitter 117 to the input of the receive amplifier 107, to test the receive path. In an alternate, preferred embodiment of the invention shown in FIG. 1A, a probe antenna 150T is connected to the output of the test transmitter 117 and directs a controlled, low power version of the multitone test signal output from the test transmitter 117 to the input of the receive amplifier 107 in the receive path. The controlled, low power version of the multitone test signal output can be received by the antenna 115, when it is appropriately switched to receive mode by switch 106. Alternately, as is shown in the alternate embodiment of FIG. 1B, a probe antenna 160R is connected to the input of the receiver amplifier 107 to receive the controlled, low power version of the multitone test signal transmitted by the probe antenna 1 15.

In the first embodiment of the invention shown in FIG. 1 and described above, the switch 120 under the control of the test controller 116 selectively directs the test signal output from the transmitter amplifier 114 to the input of the test receiver 118, to test the transmit path. In an alternate, preferred embodiment of the invention shown in FIG. 1A, a probe antenna 150R is connected to the input of the test receiver 118 and receives the test signal output from the transmitter amplifier 114 to the input of the test receiver 118. A controlled, low power version of the test signal output by transmitter amplifier 114 can be transmitted by the antena 115, when it is appropriately switched to transmit mode by switch 106. Alternately, as is shown in the alternate embodiment of FIG. 1B, a probe antenna 160T is connected to the output of the transmitter amplifier 114 to transmit the controlled, low power version of the test signal output by the transmitter amplifier 114 to the probe antenna 150R input to the test receiver 118.

The receive compensation weights and the transmit compensation weights compensate for any differences in the characteristics of the two paths. The retro directivity principle described for the PWAN system relies on the condition that the characteristics of the transmit and receive paths are identical. However, because of component drift and other changes with time in the two paths, their characteristics are not identical. In accordance with the invention, the receive compensation weights and the transmit compensation weights are used by the DSP to compensate for any differences in the characteristics of the two paths. This brings the transfer function of the circuitry in the transmit path and the receive path more nearly the same. The compensation weights may be altered in only the transmit path, to bring the characteristics of the transmit path into equality with the characteristics of the receive path. The set of compensating weights can be applied to the transmitted data so that at the antenna, the transmit (forward) and receive (reverse) path look identical.

In the PWAN system, the de-spreading weights at the receiving node (the base station) are with minor modification used as spreading weights on transmission. If the link media were truly identical, there would be identical weights in both paths. The problem is that either through drift, tolerances in the electronics, and other real life variations the two links are not absolutely identical. In accordance with the invention, the compensation weights are applied by the DSP as an additive factor to the DMT-SS despreading and the spreading weights, to make the effect of the de-spreading weights and the spreading weights the same.

In TDD receive mode at the base station, the transmit path is idle. The transmit path compensation measurement is performed by sending out a predetermined set of tones through the transmitter 114. This is received by the probe antenna 150R in FIG. 1A and demodulated and investigated. This gives a measurement of the base station's transfer function from the transmitter 114 to the probe antenna 150R and the test receiver 118. The probe antenna 150R is positioned near the antenna 115 on the base station. The point on the path between the each of the plurality of antennas 115 and the probe antenna 150R should be phase matched. The same can be said for the probe antenna 150T, for its position near the antenna 115 on the base station. In an alternate embodiment, the probe antenna 150R and the probe antenna 150T can be the same physical antenna, suitably switched in its connection to the test receiver 118 and the test transmitter 117, respectively, by the test controller 116.

The compensation measurements of the receive and transmit circuitry are made during the idle time of the circuitry. The time division duplexing of the airlink results in a 50% duty cycle for the utilization of the transmit and receive circuits. Therefore, compensation measurements can be performed with the circuitry when the airlink does not require their use.

Use of the T/R duty cycle of the forward and reverse circuits to make T/R compensation measurements frees system bandwidth and provides much greater measurement flexibility.

The personal wireless access network (PWAN) system described in the referenced Alamouti, et al. patent application provides a more detailed description of the transmit path components and the receive path components alternately used in the TDD mode of operation. The base station transmits information to multiple remote stations (or remote units) in its cell. The transmission formats are for a 64 kbits/sec traffic channel, together with a 4 kbps Link Control Channel (LCC) between the Base and a Remote Unit. The binary source delivers data to the sender's transmitter at 64 kbits/sec. This translates to 48 bits in one transmission burst. The information bits are encrypted according to a triple data encryption standard (DES) algorithm. The encrypted bits are then randomized in a data randomization block. A bit to octal conversion block converts the randomized binary sequence into a sequence of 3-bit symbols. The symbol sequence is converted into 16 symbol vectors. The term vector generally refers to a column vector which is generally complex. One symbol from the LCC is added to form a vector of 17 symbols.

The 17-symbol vector is trellis encoded. The trellis encoding starts with the most significant symbol (first element of the vector) and is continued sequentially until the last element of the vector (the LCC symbol). This process employs convolutional encoding that converts the input symbol (an integer between 0 and 7) to another symbol (between 0 and 15) and maps the encoded symbol to its corresponding 16 QAM (or 16 PSK) signal constellation point. The output of the trellis encoder is therefore a vector of 17 elements where each element is signal within the set of 16 QAM (or 16 PSK) constellation signals. (The term signal will generally refer to a signal constellation point.) A link maintenance pilot signal (LMP) is added to form an 18-signal vector, with the LMP as the first elements of the vector. The resulting (18×1) vector is pre-multiplied by a (18×18) forward smearing matrix to yield a (18×1) vector b.

Vector b is element-wise multiplied by the (18×1) gain preemphasis vector to yield another (18×1) vector, c, where p denotes the traffic channel index and is an integer. Vector c is post-multiplied by a (1×32) forward spatial and spectral spreading vector to yield a (18×32) matrix R(p). The number 32 results from multiplying the spectral spreading factor 4 and spatial spreading factor 8. The 18×32 matrices corresponding to all traffic channels carried (on the same traffic partition) are then combined (added) to produce the resulting 18×32 matrix S.

The matrix S is partitioned (by groups of four columns) into eight (18×4) submatrices ($A_0$ to $A_7$). (The indices 0 to 7, corresponds to the antenna elements over which these symbols will eventually be transmitted.) Each submatrix is mapped to tones within one traffic partition.

A lower physical layer places the baseband signals in discrete Fourier transfer (DFT) frequency bins where the data is converted into the time domain and sent to its corresponding antenna elements (0 to 7) for transmission over the air.

This process is repeated from the start for the next 48 bits of binary data to be transmitted in the next forward transmission burst.

The resulting invention compensates for drift in the characteristics of the transmit path and the receive path without imposing additional overhead on the traffic bearing channels.

Although the preferred embodiments of the invention have been described in detail above, it will be apparent to those of ordinary skill in the art that obvious modifications may be made to the invention without departing from its spirit or essence. Consequently, the preceding description should be taken as illustrative and not restrictive, and the scope of the invention should be determined in view of the following claims.

What is claimed is:

1. In a highly bandwidth-efficient communications method, including the steps of:

receiving in a receive path at a base station during a first time period a first spread signal comprising a first data signal spread over a plurality of discrete tones;

compensating for drift in said receive path during said first time period by applying receive compensation weights to said first spread signal;

testing a transmit path at said base station during said first time period and compiling transmit compensation weights;

spreading a second data signal at the base station with a spreading code that distributes the second data signal over a plurality of discrete tones during a second time period;

applying said transmit compensation weights to said second data signal during said second time period;

transmitting said second spread signal during said second time period;

testing said receive path at said base station during said second time period and compiling new receive compensation weights;

in a first TDD interval, testing the receive path of a first antenna during a base station transmission period;

applying a multitone signal to the input of a receive amplifier in the receive path;

compiling receive path compensation weights and storing them in a receive path compensation buffer; and applying the receive path compensation weights in later TDD receive periods.

2. In the highly bandwidth-efficient communications method of claim 1, wherein said first and second time periods are part of a time division duplex interval.

3. In the highly bandwidth-efficient communications method of claim 1, wherein said compensation measurements are made for the transmission path during the receive portion of a time division duplex cycle and compensation measurements are made for the receive path during the transmit portion of the TDD cycle.

4. In the highly bandwidth-efficient communications method of claim 1, wherein said base station has multiple antennas for spatial spreading and despreading of discrete multitone spread spectrum (DMT-SS) communications.

5. In the highly bandwidth-efficient communications method of claim 4, wherein each said antenna has its own transmission path components and receive path components.

6. In the highly bandwidth-efficient communications method of claim 5, wherein a transmit amplifier in the transmit path and a receive amplifier in the receive path tend to drift in their characteristics over time.

7. In the highly bandwidth-efficient communications method of claim 5, wherein said compensation steps further comprise:

managing sequential testing of each respective transmission path and receive path for each antenna;

measuring a drift of the transmit path components and the receive path components and preparing compensating weights to be applied to signals processed in each path.

8. In a highly bandwidth-efficient communications method, including the steps of:

receiving in a receive path at a base station during a first time period a first spread signal comprising a first data signal spread over a plurality of discrete tones;

compensating for drift in said receive path during said first time period by applying receive compensation weights to said first spread signal;

testing a transmit path at said base station during said first time period and compiling transmit compensation weights, spreading a second data signal at the base station with a spreading code that distributes the second data signal over a plurality of discrete tones during a second time period;

applying said transmit compensation weights to said second data signal during said second time period;

transmitting said second spread signal during said second time period; and testing said receive path at said base station during said second time period and compiling new receive compensation weights;

wherein said base station has multiple antennas for spatial spreading and despreading of discrete multitone spread spectrum (DMT-SS) communications;

wherein each said antenna has its own transmission path components and receive path components;

wherein said compensation steps further comprise:

managing sequential testing of each respective transmission path and receive path for each antenna;

measuring a drift of the transmit path component and the receive path components and preparing compensating weights to be applied to signals processed in each path;

wherein in a first TDD interval, testing the receive path of a first antenna during a base station transmission period;

applying a multitone signal to the input of a receive amplifier in the receive path;

compiling receive path compensation weights and storing them in a receive path compensation buffer;

applying the receive path compensation weights in later TDD receive periods.

9. In the highly bandwidth-efficient communications method of claim 8, wherein in the base receive period applying a multitone test signal output to a transmitter in the transmit path to an input of a test receiver;

processing the received test signal applied by the test receiver;

compiling transmit path compensation weights and storing them in a transmit path compensation buffer;

applying the transmit path compensation weights thereafter to signals transmitted from the base station.

10. In the highly bandwidth-efficient communications method of claim 9, wherein repeating said testing and compensation steps for a second antenna in the next consecutive TDD interval.

11. In a highly bandwidth-efficient communications system, comprising:

means for receiving in a receive path at a base station during a first time period a first spread signal comprising a first data signal spread over a plurality of discrete tones;

means for compensating for drift in said receive path during said first time period by applying receive compensation weights to said first spread signal;

means for testing a transmit path at said base station during said first time period and compiling transmit compensation weights;

means for spreading a second data signal at the base station with a spreading code that distributes the second data signal over a plurality of discrete tones during a second time period;

means for applying said transmit compensation weights to said second data signal during said second time period;

means for transmitting said second spread signal during said second time period;

means for testing said receive path at said base station during said second time period and compiling new receive compensation weights;

means for testing in a first TDD interval the receive path of a first antenna during a base station transmission period;

means for applying a multitone signal to the input of a receive amplifier in the receive path;

means for compiling receive path compensation weights and storing them in a receive path compensation buffer; and means for applying the receive path compensation weights in later TDD receive periods.

12. In the highly bandwidth-efficient communications system of claim 11, wherein said first and second time periods are part of a time division duplex interval.

13. In the highly bandwidth-efficient communications system of claim 11, wherein said compensation measurements are made for the transmission path during the receive portion of a time division duplex cycle and compensation measurements are made for the receive path during the transmit portion of the TDD cycle.

14. In the highly bandwidth-efficient communications system of claim 11, wherein said base station has multiple antennas for spatial spreading and despreading of discrete multitone spread spectrum (DMT-SS) communications.

15. In the highly bandwidth-efficient communications system of claim 14, wherein each said antenna has its own transmission path components and receive path components.

16. In the highly bandwidth-efficient communications system of claim 15, wherein a transmit amplifier in the transmit path and a receive amplifier in the receive path tend to drift in their characteristics over time.

17. In the highly bandwidth-efficient communications system of claim 15, which further comprises:

means for managing sequential testing of each respective transmission path and receive path for each antenna;

means for measuring a drift of the transmit path components and the receive path components and preparing compensating weights to be applied to signals processed in each path.

18. In a highly bandwidth efficient communications system, comprising:

means for receiving in a receive path at a base station during a first time period a first spread signal comprising a first data signal spread over a plurality of discrete tones;

means for compensating for drift in said receive path during said first time period by applying receive compensation weights to said first spread signal;

means for testing a transmit path at said base station during said first time period and compiling transmit compensation weights;

means for spreading a second data signal at the base station with a spreading code that distributes the second data signal over a plurality of discrete tones during a second time period;

means for applying said transmit compensation weights to said second data signal during said second time period;

means for transmitting said second spread signal during said second time period;

means for testing said receive path at said base station during said second time period and compiling new receive compensation weights;

wherein said base station has multiple antennas for spatial spreading and despreading of discrete multitone spread spectrum (DMT-SS) communications;

wherein each said antenna has its own transmission path components and receive path components;

means for managing sequential testing of each respective transmission path and receive path for each antenna;

means for measuring a drift of the transmit path components and the receive path components and preparing compensating weights to be applied to signals processed in each path;

means for testing in a first TDD interval, the receive path of a first antenna during a base station transmission period;

means for applying a multitone signal to the input of a receive amplifier in the receive path;

means for compiling receive path compensation weights and storing them in a receive path compensation buffer; and means for applying the receive path compensation weights in later TDD receive periods.

19. In the highly bandwidth-efficient communications system of claim 18, wherein means for applying in the base receive period, a multitone test signal output to a transmitter in the transmit path to an input of a test receiver;

means for processing the received test signal applied by the test receiver;

means for compiling transmit path compensation weights and storing them in a transmit path compensation buffer; and means for applying the transmit path compensation weights thereafter to signals transmitted from the base station.

20. In the highly bandwidth-efficient communications system of claim 19, which further comprises:

means for repeating said testing and compensation steps for a second antenna in the next consecutive TDD interval.

* * * * *